July 28, 1953  C. G. BARDEN  2,646,909
SIDE RACK FOR VEHICLES

Filed April 12, 1952  2 Sheets-Sheet 1

INVENTOR
Carl G. Barden

BY
ATTORNEYS

July 28, 1953 C. G. BARDEN 2,646,909
SIDE RACK FOR VEHICLES
Filed April 12, 1952 2 Sheets-Sheet 2
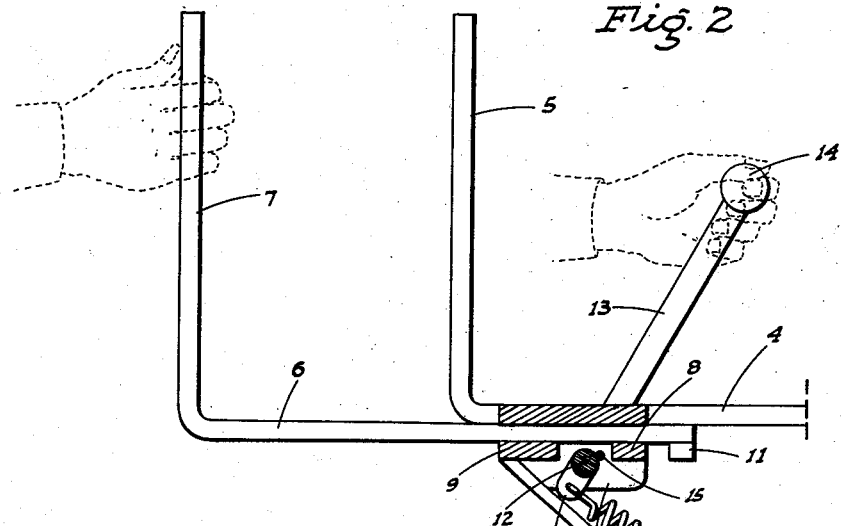
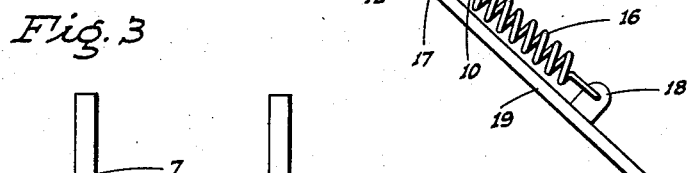
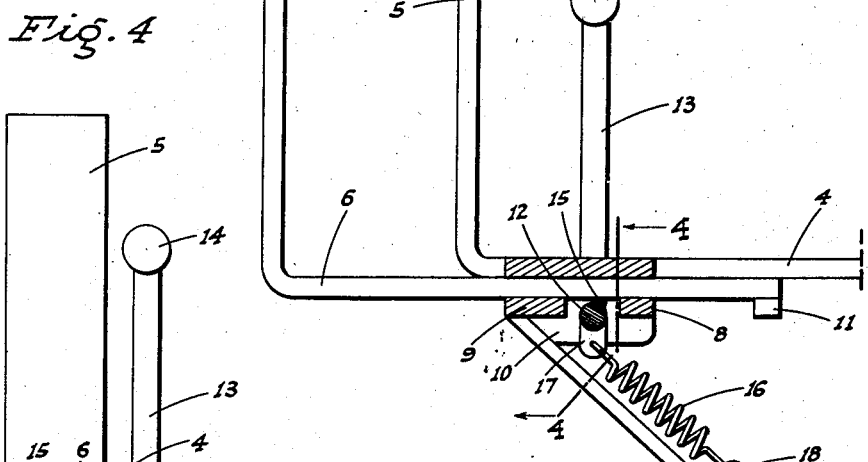
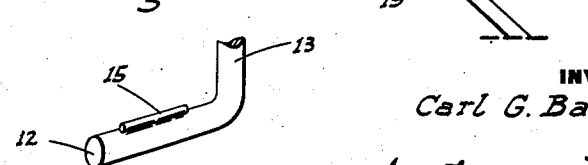
INVENTOR
Carl G. Barden Patented July 28, 1953

2,646,909

UNITED STATES PATENT OFFICE 2,646,909

SIDE RACK FOR VEHICLES

Carl G. Barden, Woodland, Calif.

Application April 12, 1952, Serial No. 282,069

2 Claims. (Cl. 224—42.03)

1

The present invention is directed to, and it is a major object to provide, an improved side rack for motor vehicles; such rack being adapted to effectively support long material such as pipe, lumber, or the like adjacent but alongside the vehicle for transport from place to place.

Another object of the invention is to provide a side rack, as above, which includes a plurality of longitudinally alined, load-receiving cradle units of novel structure; such units being secured in stand-out relation in connection with the vehicle by suitable attachment mounts.

An additional object of the invention is to provide a side rack for motor vehicles, wherein each of said cradle units is adjustable in effective width whereby to accommodate different sized loads, and to clamp the load from opposite sides for transport.

A further object of the invention is to provide a side rack wherein each cradle unit, as in the preceding paragraph, includes an upstanding fixed jaw and an upstanding movable jaw disposed for engagement of the load therebetween; there being novel, manually releasable means normally holding the movable jaw against movement away from the fixed jaw.

A still further object of the invention is to provide a side rack which is especially designed, but not limited, for use in connection with pick-up trucks or similar vehicles.

Still another object of the invention is to provide a side rack which is designed for ease and economy of manufacture.

It is also an object of the invention to provide a practical and reliable side rack, and one which will be exceedingly effective for the purpose for which it is designed.

These objects are accomplished by means of such structure and relative arrangement of parts as will fully appear by a perusal of the following specification and claims.

In the drawings:

Fig. 2 is an elevation, partly in section, of one of the cradle units showing the holding means as released, and the movable jaw being adjusted.

Fig. 3 is a similar view but shows the cradle unit as locked up for use.

Fig. 4 is a transverse section taken on line 4—4 of Fig. 3.

Fig. 5 is a fragmentary perspective view showing the cross shaft, and the cam lug thereon, detached.

Figure 1:
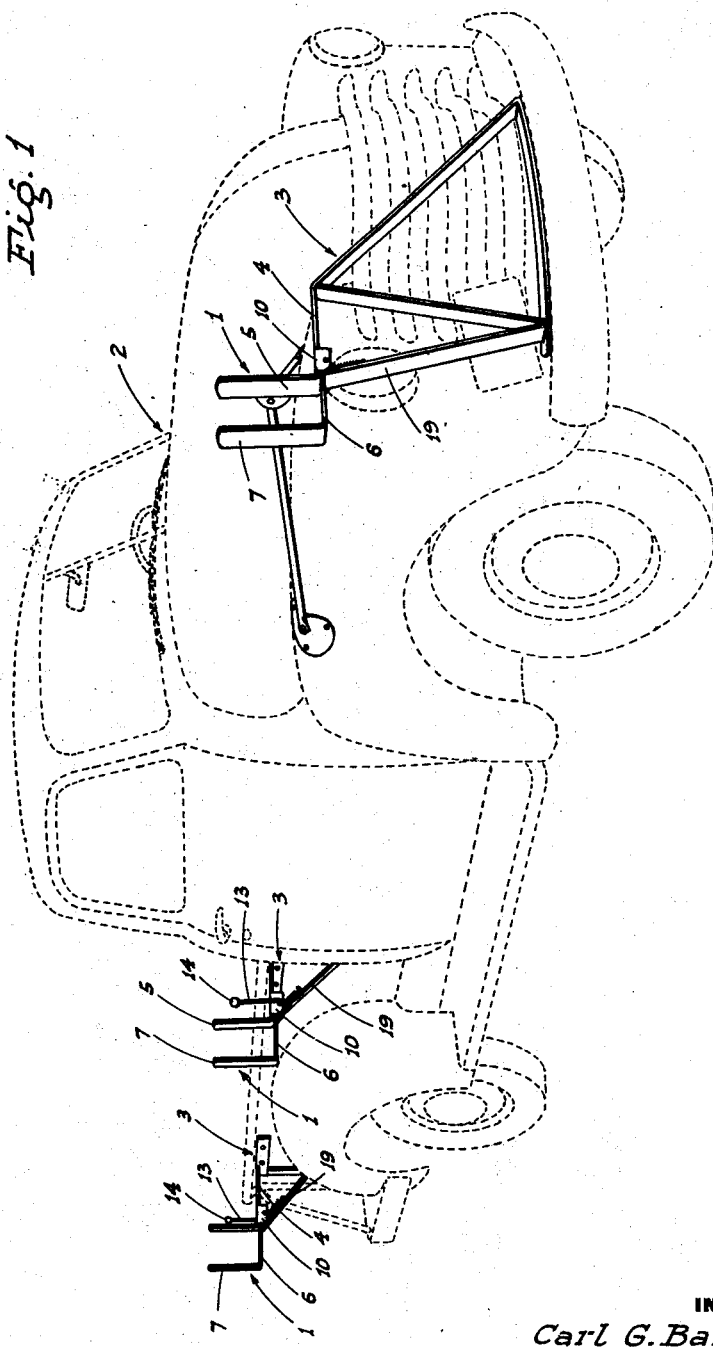
Fig. 1 is a perspective view of a motor vehicle having the side rack attached thereto.

Referring now more particularly to the characters of reference on the drawings, the side rack comprises a plurality of cradle units, indicated generally at 1, disposed in spaced relation, and in alinement, along one side of a motor vehicle, here shown as a pick-up truck 2.

Each of the cradle units 1 is secured—in stand-out relation—to an adjacent part of the truck 2; this being accomplished by means of suitable attachment mounts, indicated generally at 3.

With the cradle units 1 in alinement lengthwise of the vehicle they serve, effectively, to support long pieces of material, such as pipe, lumber, or the like, for ready and convenient transport from place to place.

As the cradle units 1 are each of identical construction, a description of one will suffice for all.

Each cradle unit 1 comprises a laterally outwardly projecting, fixed top bar 4 secured at its inner end to the related attachment mount 3; such top bar 4 preferably being horizontal.

At its outer end the fixed top bar 4 is formed with an integral, upstanding fixed jaw 5 of substantial height.

The fixed top bar 4 is engaged from below, and in matching relation, by a laterally outwardly projecting bottom bar 6; said bottom bar 6 extending a distance outwardly of the fixed jaw 5, and at the outer end thereof said bar 6 is formed with an integral, upstanding jaw 7, hereinafter referred to as the adjustable jaw.

The adjustable jaw 7 is of substantially the same height as the fixed jaw 5 and is adapted to work in cooperation with the latter, being in alinement therewith in the direction of sliding movement of the bottom bar 6.

Said bottom bar 6 is supported, in slidable relation to the top bar 4, by transverse guide blocks 8 and 9 which engage beneath said bottom bar 6 in spaced relation adjacent but short of the vertical plane of the fixed jaw 5; the guide blocks 8 and 9 being fixedly supported at opposite ends by side plates 10 which depend from opposite sides of the top bar 4.

The bottom bar 6 is prevented from sliding too far outwardly; i. e. from escaping the guide blocks 8 and 9, by means of a stop 11 secured to and depending from the inner end of said bottom bar 6. However, the bottom bar 6 is of a length which permits of substantial longitudinal sliding adjustment thereof, whereby considerable variance in the spacing between the jaws 5 and 7 may be had. The jaw 7 is adjusted in or out by hand in the manner shown in Fig. 2.

However, the bottom bar 6 and jaw 7 are normally maintained against outward motion by the following holding means:

A cross shaft 12 is journaled in connection with and spans between the side plates 10, and at one such shaft is formed with an upstanding hand lever 13 having a knob 14 on its upper end; the cross shaft 12 being disposed in a position intermediate the spaced guide blocks 8 and 9.

On top thereof, but slightly inwardly of top deadcenter, the cross shaft 12 is fitted with a longitudinal, radially extending cam lug 15 which normally wedgingly engages the under side of the bottom bar 6, preventing the latter from sliding motion in an outward direction.

Such engagement of the cam lug 15 with the under side of the bottom bar 6 is maintained by reason of a constant counter-clockwise turning force on the cross shaft 12 imposed by a tension spring 16. Such tension spring 16 connects between a depending ear 17 on the cross shaft 12 and a fixed ear 18 on a diagonal brace 19 which extends at a downward and inward incline from the outer guide block 9.

The brace 19 comprises an element of the related attachment mount 3.

When it is desired to adjust the jaw 7 outwardly it is grasped in one hand and the knob 14 is grasped in the other hand, the latter swinging the hand lever 13 inwardly. This results in turning the cross shaft 12 in a direction to release the cam lug 15 from the bottom bar 6, whence the latter is free to slide outwardly.

After each cradle unit 1 has been adjusted, as above, and the load placed therein, such load is clamped between the fixed jaw 5 and adjustable jaw 7 by the simple expedient of manually pressing the latter inwardly. With inward motion of the adjustable jaw 7, the bottom bar 6 correspondingly slides inwardly, riding over the cam lug 15 but being prevented from outward retraction by the same.

With the described side rack, for motor vehicles, long pieces of material can be readily transported from place to place, with such material effectively clamped in each cradle unit 1 during the period of transport.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. In a motor vehicle side rack, a load carrying cradle comprising a fixed laterally projecting top bar having an upstanding jaw on its outer end, a bottom bar projecting laterally out from under and slidable against the top bar and having an upstanding jaw on its outer end, means slidably mounting the bottom bar for longitudinal movement relative to the top bar, said means comprising side plates depending from the top bar adjacent its outer end and guide blocks extending between the plates under the lower bar and spaced apart lengthwise of said bar; a rotary cross shaft journaled in the plates below said space, an element on the shaft between the plates forming a cam to engage the underside of the lower bar and clamp the same against the top bar upon rotation of the shaft in one direction, spring means to so rotate the shaft, and an upstanding lever on the shaft outwardly of the side plates to rotate the shaft in the opposite direction.

2. A device as in claim 1, in which the cam is disposed on the shaft so that the lever is moved in a direction laterally inward of the first named jaw to release the cam from the under side of the bottom bar.

CARL G. BARDEN.

References Cited in the file of this patent

UNITED STATES PATENTS

| Number | Name | Date |
|---|---|---|
| 457,781 | Josef | Aug. 18, 1891 |
| 1,312,562 | Morse | Aug. 12, 1919 |
| 2,233,273 | Di Vincenzo | Feb. 25, 1941 |

FOREIGN PATENTS

| Number | Country | Date |
|---|---|---|
| 193,277 | Great Britain | Feb. 22, 1923 |